Jan. 1, 1957 J. V. CALTAGIRONE ET AL 2,776,143

SOUND RECORDING APPARATUS

Filed March 5, 1952 2 Sheets-Sheet 1

INVENTORS
JOSEPH V. CALTAGIRONE
AUGUST NICHOLS
BY Henry M. Chapin
ATTORNEY

Jan. 1, 1957 J. V. CALTAGIRONE ET AL 2,776,143

SOUND RECORDING APPARATUS

Filed March 5, 1952 2 Sheets-Sheet 2

INVENTORS
JOSEPH V. CALTAGIRONE
AUGUST NICHOLS
BY Henry M. Chapin
ATTORNEY

United States Patent Office 2,776,143

Patented Jan. 1, 1957

2,776,143

SOUND RECORDING APPARATUS

Joseph V. Caltagirone, Brooklyn, and August Nichols, New York, N. Y.; said Nichols assignor to said Caltagirone Application March 5, 1952, Serial No. 274,990

2 Claims. (Cl. 274—13)

This invention relates to sound recording apparatus of the phonograph type wherein a modulated spiral groove is inscribed in a record by a stylus which is moved radially across the record while the latter rotates.

In all commercially available phonographs known to me prior to the present invention the inscribing stylus has been moved across the record by intricately formed precision-machined mechanical devices. One of the most popular of such devices has comprised a long precision-machined lead screw driving a travelling nut which carries the inscribing stylus. Devices of this character are expensive to construct, thus adding considerably to the cost of a recording phonograph. Furthermore the inherent tolerance requirements of machining make it impossible to manufacture at any reasonable cost a device which will inscribe grooves as close as is desirable for a truly long-playing record, for example 350 lines to the inch.

In accordance with the present invention there is provided a novel friction drive for moving a stylus across a record at a uniformly slow speed so accurately that lines can be inscribed on the record extremely close together, for example 350 lines per inch. Furthermore, the friction drive is so designed that the inscribing stylus can be quickly lifted from the surface of the record, disengaged from the driving mechanism, and then placed at another part of the surface and reengaged with the driving mechanism.

The principles of the invention will become apparent from the following detailed description, having reference to the accompanying drawings wherein.

Figure 1:
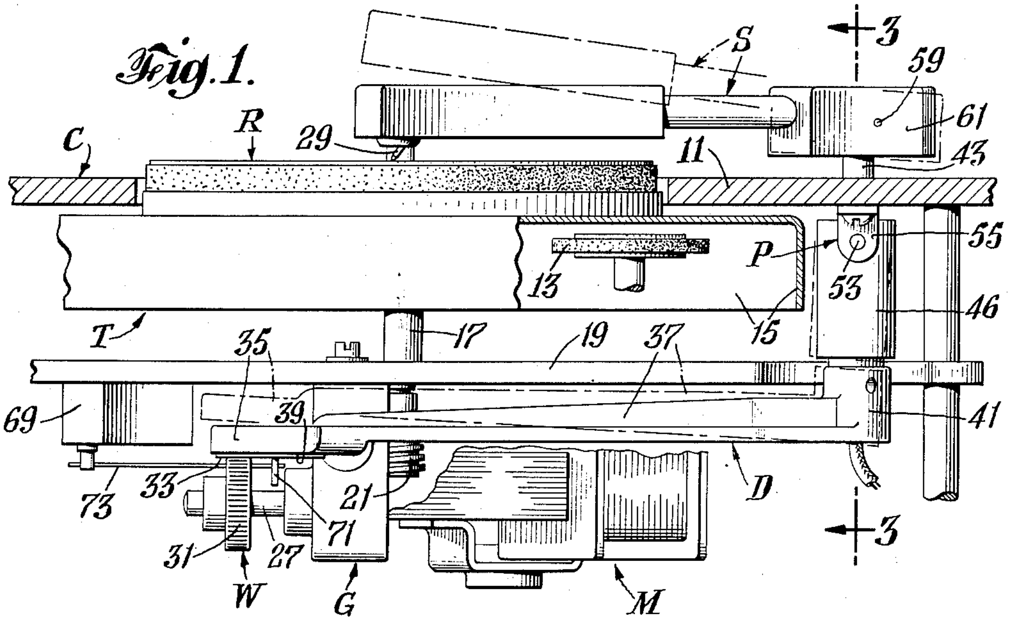
Figure 1 is a vertical mid-sectional view of a phonograph embodying the invention, parts being shown in elevation.
Figure 3:
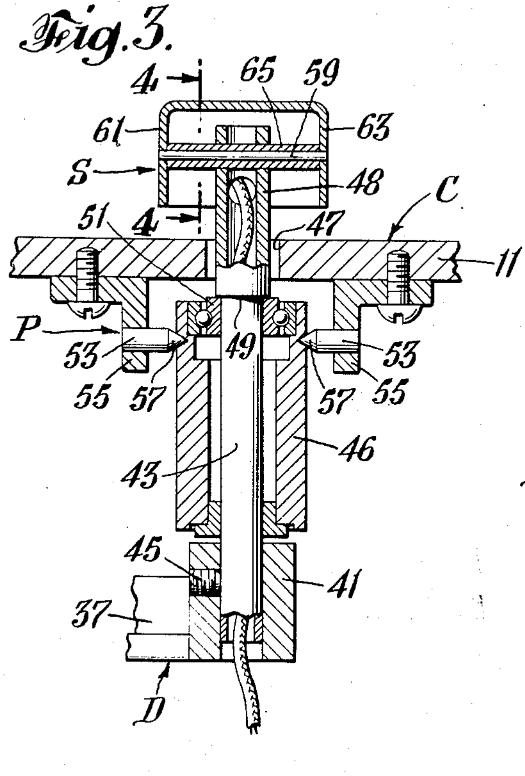

Viewed as a general assembly the sound recording apparatus of the invention includes a cabinet C in which is set a rotatable tablet table T driven by an electrical driving motor M. Table T in turn operates a gear reduction unit G which rotates a driving wheel W frictionally engaging a driving arm D.

A stylus-supporting arm S is positioned above the table T and is mounted on pivot means P for pivotal movement in a first plane parallel to the table for moving a stylus across a record R on the table.

Driving arm D is connected to stylus-supporting arm S and is adapted for pivotal movement concurrently with the latter to move the stylus across the record.

Both of the arms D and S are also supported by pivot means P for movement in unison in a second plane which is normal to the first plane and to the table T, for disengaging arm D from driving wheel W simultaneously with the raising of stylus arm S. When thus disengaged, stylus arm S can be moved to any desired position above table T and then lowered to reengage driving arm D with driving wheel W.

More in detail, motor M is suspended from a cabinet top 11 and drives a wheel 13 which frictionally engages the inside wall of a downwardly extending flange 15 on the outside of tablet table T to rotate the latter on a shaft 17 which is journalled in a bracket 19. Shaft 17 projects vertically down through bracket 19 and carries on its lower end a vertical worm 21. Worm 21 meshes with and drives a worm gear 23 on a horizontal shaft 25 of a speed reducing unit G, and power is transmitted therethrough to a second horizontal shaft 27 arranged at right angles to shaft 25 and carrying thereon the driving wheel W.

Speed reducing unit G is so designed that wheel W rotates at a speed just sufficient to move stylus arm S across the record at a speed which gives the closest possible groove spacing. For example when motor M drives the tablet table T at 33⅓ revolutions per minute, the wheel W rotates at $\frac{1}{15}$ revolution per minute and a stylus 29 near the outer end of stylus arm S travels toward the center of the record R at a linear speed of .0025 inch per revolution of the table.

Driving wheel W has a peripheral surface 31 having a high coefficient of friction, for example a knurled metal surface, which engages the flat bottom surface 33 of a horizontal arc-shaped cross arm 35 projecting laterally from the outer end of a radius arm 37 and forming therewith the driving arm D. Cross arm 35 comprises a metal member into which is set a strip of rubber 39 to assure a surface having a higher coefficient of friction than the metal to cooperate with wheel W.

The inner end of radius arm 37 comprises a sleeve 41 which fits over the lower end of a hollow vertical shaft 43 and is secured thereto by a set screw 45. Shaft 43 extends up through a sleeve 46 and projects from the top of the sleeve up through an aperture 47 to a position above the table top 11. The portion 48 of shaft 43 above sleeve 41 is of enlarged diameter to provide a downwardly facing shoulder 49 which rests on the inner race of a bearing 51 forming the top of the sleeve. Shoulder 49 supports shaft 43 on the sleeve 46 while permitting rotation of the shaft in the sleeve so that the stylus arm S can move pivotally in a plane parallel to tablet table T.

Pivotal movement of the stylus arm S and the driving arm D in a second plane normal to the plane of table T, to disengage the arm D from driving wheel W, is obtained by mounting sleeve 46 on two horizontal pivot pins 53 carried by two brackets 55 which project down from the bottom of cabinet top 11 on opposite sides of the sleeve. Pivot pins 53 have conical points 57 which are located in mating cavities on opposite sides of sleeve 46.

Figure 4:
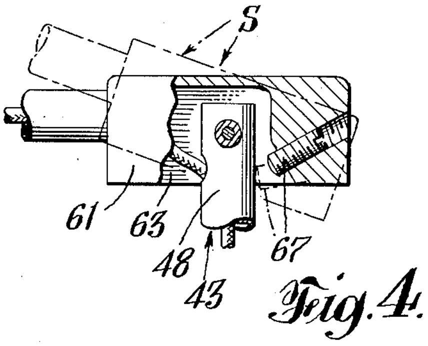
Figure 4 is a sectional view of a part of the phonograph, taken along the line 4—4 in Figure 3.
Figure 5:
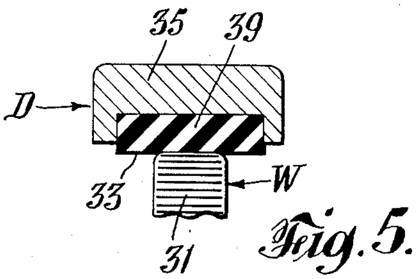
Figure 5 is a sectional view taken along the line 5—5 in Figure 2.

Stylus arm S is secured to the top of shaft 43 by a horizontal pivot pin 59 secured at its ends in flanges 61 and 63 of arm S on opposite sides of the shaft, and passing through a tubular bushing 65 which fits within a pair of axially aligned horizontal bores near the top of the shaft. This construction permits the stylus arm S to be moved a short distance up and down on the bushing 65 as a pivot, without affecting the driving arm D. The extent of this independent movement is limited by a stop bolt 67 which is adjustably threaded in the inner end of stylus arm S in position to strike the side of shaft 43 (see Fig. 4). Upward movement of the stylus arm S after the end of stop 67 has touched shaft 43 causes sleeve 46 to swing on pivots 53 and lift driving arm D from driving wheel W.

Figure 2:
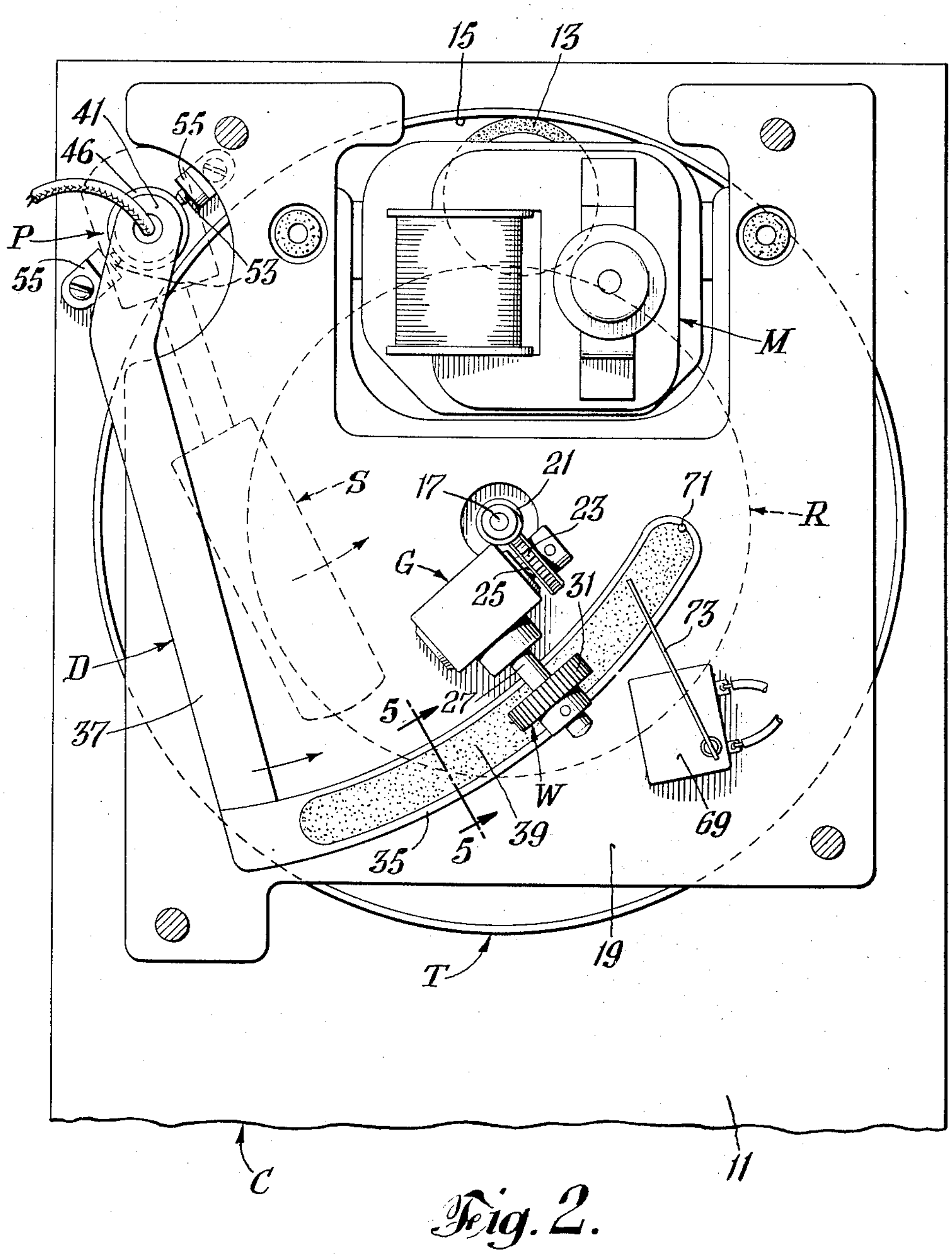
Figure 2 is a plan view of the phonograph as seen from the bottom in Figure 1.

As shown in Figure 2, our novel phonograph also comprises an automatic mechanism for starting and stopping the driving motor M in accordance with the position of the stylus 29 on record R. When stylus arm S is in a position such that stylus 29 is off the record, a spring-closed switch 69 in circuit with motor M is held open by a pin 71 on the end of cross arm 35, which bears against a switch lever 73. When stylus arm S is moved to place stylus 29 on the record, pin 71 release lever 73 and permits the switch to close automatically and start operation of motor M.

When recording sound on a record R with our improved phonograph, a positive and extremely accurate drive of the stylus 29 across the record is obtained in exact synchronism with the rotating record. Furthermore, if at any moment relocation of the stylus on the record is desired it is only necessary to lift the stylus arm S to disengage the driving wheel W from the driving arm D, whereupon the stylus can be moved to the proper position and the driving mechanism reengaged simply by lowering the stylus arm S.

Changes in the construction and relative arrangement of parts, and substitution of equivalent parts for those specifically described, can be made within the spirit of the invention and within the scope of the claims appended hereto. For example, separate motors can be used for driving the tablet table and the driving arm.

We claim:

1. Sound recording apparatus comprising a horizontal rotatable tablet table; a horizontal base plate; bracket means projecting from said base plate; a pair of opposed horizontal conical pivots projecting toward one another from said bracket means; a vertical supporting sleeve having a pair of external conical cavities on opposite sides thereof receiving said pivots whereby said sleeve is pivoted for movement in a vertical plane; a vertical shaft journalled within said sleeve and extending from a position below said sleeve up to a position above said base plate; a stylus supporting arm mounted on said shaft above said base plate; a driving arm mounted on said shaft below said sleeve, said driving arm and said stylus supporting arm being movable in unison with said shaft; and driving mechanism below said base plate engaging said driving arm.

2. Apparatus in accordance with claim 1, wherein said sleeve includes a ball bearing, and wherein said vertical shaft has a shoulder resting on the top of said ball bearing, and a shaft section of relatively small diameter passing down through said ball bearing.

References Cited in the file of this patent

UNITED STATES PATENTS

| | | |
|---|---|---|
| 1,133,685 | Weber | Mar. 30, 1915 |
| 1,184,333 | Edison | May 23, 1916 |
| 1,809,901 | Jones | June 16, 1931 |
| 1,819,737 | Craig | Aug. 18, 1931 |
| 2,254,519 | Fouch | Sept. 2, 1941 |
| 2,270,972 | Schneider | Jan. 27, 1942 |
| 2,300,149 | Guedon | Oct. 27, 1942 |
| 2,378,509 | Stephan | June 19, 1945 |
| 2,552,757 | Adler | May 15, 1951 |

FOREIGN PATENTS

| | | |
|---|---|---|
| 35,720 | Austria | Jan. 11, 1909 |